United States Patent [19]

Kohzai et al.

[11] 4,398,138

[45] Aug. 9, 1983

[54] SPINDLE ORIENTATION CONTROL METHOD AND APPARATUS

[75] Inventors: Yoshinori Kohzai, Hino; Yoshiki Fujioka, Higashiyamato; Naoto Ota, Hino, all of Japan

[73] Assignee: Fujitsu Fanuc Limited, Tokyo, Japan

[21] Appl. No.: 316,761

[22] Filed: Oct. 30, 1981

[30] Foreign Application Priority Data

Oct. 30, 1980 [JP] Japan .................. 55-152701

[51] Int. Cl.³ .............................................. G05B 19/28
[52] U.S. Cl. ................................ 318/603; 318/561
[58] Field of Search ............... 318/603, 561, 571, 592; 234/17

[56] References Cited

U.S. PATENT DOCUMENTS

| | | | |
|---|---|---|---|
| 4,207,504 | 6/1980 | Kawada et al. | 318/616 X |
| 4,215,300 | 7/1980 | Schmidt | 318/603 |
| 4,297,624 | 10/1981 | Komiya | 318/603 X |
| 4,347,471 | 8/1982 | Kohzai et al. | 318/616 |

*Primary Examiner*—B. Dobeck
*Attorney, Agent, or Firm*—Staas & Halsey

[57] ABSTRACT

A spindle orientation control system having a speed control circuit and a position control circuit for rotating the spindle of a machine tool at a commanded speed and for stopping the spindle at a designated position with a high accuracy, the speed control circuit decelerating the spindle drive motor on the basis of a spindle stopping command. When a predetermined speed has been attained, a counter contained in the position control circuit is triggered by a one-revolution pulse generated whenever the spindle makes one full revolution, whereby the counter begins to count up position pulses which are generated whenever the spindle rotates by a predetermined angle. After a preset predetermined number of pulses have been counted, operation shifts from the speed control mode to a position control mode, and said counter is preset to a number of pulses corresponding to the angle from the present position of the spindle to the desired stopping position. Said pulse number is counted down by the position pulses and, at the same time, a voltage having a level which is proportional to the content of the counter is applied to the spindle drive motor, thereby reducing its rotational speed. When the content of the counter reaches a value of zero, the spindle is stopped at the predetermined position. Adjusting the value preset in the counter makes it possible to correct a spindle stopping position error that results from a difference in the position of the leading or trailing edge of the one revolution pulse, said difference arising because the position of the leading or trailing edge of the one-revolution pulse varies depending upon the direction of spindle rotation.

10 Claims, 12 Drawing Figures

SPINDLE ORIENTATION CONTROL METHOD AND APPARATUS

FIELD OF THE INVENTION

This invention relates to a spindle orientation control system and, more particularly, to a spindle orientation control system capable of rotating the spindle of a machine tool at a commanded speed, and of stopping the spindle at a commanded angular position with a high accuracy.

BACKGROUND OF THE INVENTION

Machine tools with an automatic tool change function are well known in the art. These are machine tools that perform machining work automatically while various tools are changed, also automatically. In order to mate a desired tool with machine tool spindle in a smooth manner, it is necessary to stop a specified portion of the spindle at a predetermined commanded angular position with a high degree of accuracy. The same is true also in boring-type machine tools in order to insert a boring rod into a hole previously drilled in workpiece. Thus the need to stop a specified portion of a spindle at a predetermined angular position or orientation in accurate fashion is quite common in mechanical machining operations.

It is conventional practice to stop a spindle at a predetermined orientation by using a mechanical control mechanism and pin mechanism. However, the pin, which serves as the stopping member, can be damaged by an externally applied force or by a machine malfunction, and the control mechanism can sustain wear owing to the effects of friction. Such penomena make it impossible to stop the spindle at the predetermined orientation, thereby impeding the smooth changing of tools and the insertion of the boring rod. Avoiding the above usually entails troublesome maintenance and inspection work as well as the frequent replacement of parts.

The present inventors have already proposed a spindle rotation control system which enables a spindle to be stopped at a predetermined orientation with a high accuracy without the use of a mechanical brake and mechanical stopping mechanism, and which permits the spindle to be rotated at a commanded speed. The previously proposed system is illustrated in FIGS. 1 through 4, in which FIG. 1 is a block diagram showing a servo system employed in spindle rotation control, FIGS. 2a and 2b are illustrative views useful in describing spindle orientation, FIG. 3 is a block diagram of a circuit for generating a position deviation signal, and FIG. 4 is a waveform diagram of signals associated with the circuit of FIG. 3.

Referring to FIGS. 1 and 2, there are provided a speed control circuit 1, a DC motor 2, a tachometer generator 3 for generating a voltage in accordance with the rotational speed of the DC motor 2, and an orientation control circuit 4 for producing a voltage in accordance with a deviation between a commanded stopping position and the actual position of a spindle. Numeral 5 denotes a tool mounted on a spindle mechanism 6. The spindle 7 of the spindle mechanism is coupled to the DC motor 2 via a belt 8, although gears may also be used for this purpose. A position coder or a pulse coder 9, such as a rotary encoder adapted to generate a pulse whenever the spindle 7 rotates by a predetermined angle, is connected directly to the spindle 7. Numeral 10 denotes a changeover switch. In FIG. 2, numeral 11 denotes an orientation portion provided on the spindle 7. A tool change cannot be performed smoothly unless the orientation portion 11 comes to rest at a predetermined angular position when the spindle 7 is stopped.

In operation, the movable contact member of the changeover switch 10 is switched over to the contact a when the tool 5 performs a machining operation, so that the speed control circuit 1 receives a command speed signal CV from a command speed signal generating circuit, which is not shown. The speed control circuit 1 also receives from the tachometer generator 3 an analog voltage AV which corresponds to the actual speed of the spindle. The speed control circuit 1 is operable to produce an analog voltage which corresponds to the deviation between the command speed signal CV (an analog voltage) and the actual speed signal AV which, as mentioned above, is an analog voltage. The speed control circuit 1 applies the analog deviation voltage to the DC motor 2 to rotate the motor at the commanded speed. Thus, the speed control circuit 1, DC motor 2, tachometer generator 3 and a feedback line FL form a speed control feedback loop which functions to rotate the DC motor 2 at the commanded speed.

When the machining work is completed and the DC motor is to be stopped, the command speed signal CV is changed over to a value such as zero volt, and the speed of the motor 2 is reduced while applying an electrical brake thereto. Then, immediately before the motor 2 comes to rest, namely at such time that the speed has reached a fairly low level, an orientation command ORCM is applied to the changeover switch 10, so that the movable member of the switch is changed over from the contact a to the contact b.

The orientation control circuit 4 is adapted to produce a rotational position deviation signal RPD, which is an analog voltage, in accordance with the deviation between a commanded stopping position which has been predetermined, and the actual angular position (orientation) of the spindle.

Reference will now be had to FIGS. 3 and 4 to describe the operation of the orientation control circuit 4 for a case where there is but one stopping position for the orientation portion 11 on the spindle 7. The arrangement is such that the signals RTS and PP from position coder 9 are used to produce a one-revolution pulse RPS for each revolution of the spindle 7, and position pulses PPF each one of which is produced whenever the spindle rotates by a predetermined angle, a total of N of these pulses PPF being produced for each single revolution of the spindle 7. The position coder 9 is attached to the spindle 7 in such a manner that the one-revolution pulse RPS is generated at such time that the orientation portion 11 on the spindle has rotated 180° from the commanded stopping position STP, shown in FIG. 2. A counter 41 shown in FIG. 3 is preset to the numerical value N upon the generation of the pulse RPS, and then has this preset value counted down by each position pulse PPF that subsequently arrives. A digital-to-analog converter (referred to as a DA converter hereinafter) 42 converts the output of counter 41 (which output signal represents the content of the counter) into an analog signal DAV which is applied to an analog subtractor 43, the latter producing a difference voltage SV between the analog voltage DAV and a constant voltage $V_c$. Accordingly, if the voltage $V_c$ is set to one-half the peak value of the analog voltage DAV from the DA converter 42, the difference signal SV will have a sawtooth waveform that crosses the zero level at such time that 180° has been covered by the spindle from the point at which the one-revolution pulse RPS is generated, as shown in FIG. 4. Since the commanded stopping position of the spindle is displaced by exactly 180° from the point at which the pulse RPS is generated, as described above, the orientation portion 11 on the spindle 7 reaches the commanded stopping position at the moment the difference voltage SV crosses the zero level. It should be noted that the difference voltage SV is proportional to the rotational position deviation signal RPD.

When the changeover switch 10 in FIG. 1 is changed over to the contact b, therefore, the speed control circuit 1 delivers a difference voltage between the rotational position deviation signal RPD and the actual speed signal AV, whereby positional servo control is executed to make the rotational position deviation signal RPD approach zero. Thus, the speed control circuit 1, DC motor 2, spindle 7, position coder 9, orientation control circuit 4 and changeover switch 10 form a position control feedback loop. When the orientation portion 11 on the spindle 7 is oriented as shown in FIG. 2(A), the spindle 7 will be rotated counter-clockwise and the orientation portion 11 will stop correctly at the commanded stopping position STP. When the orientation portion 11 is oriented as shown in FIG. 2(B), the spindle will be rotated clockwise and the orientation portion will stop correctly at the commanded stopping position STP.

Thus the previously proposed system rotates the spindle correctly at the commanded speed during rotation, and stops the spindle at the commanded stopping position when the spindle is to be stopped. However, a problem encountered in the foregoing system is that there is a shift in the spindle stopping position which depends upon the direction in which the spindle is rotating. This will now be described in detail with reference to FIG. 5.

FIG. 5 is a waveform diagram which is useful in describing the shift in the spindle stopping position. As stated above, the position coder 9 produces the one-revolution signal RTS each time the spindle makes one complete revolution. Since the signal RTS has a sinusoidal shape, as shown in FIG. 5(A), it is converted into a one-revolution pulse RPS having the shape of a rectangular wave upon comparison with a predetermined slicing level. In order to prevent erroneous operation caused by an external disturbance, the slicing circuit is set in such a manner that the slicing level when the signal RTS is rising differs from the slicing level when the signal RTS is decaying. In other words, the slicing circuit is furnished with a hysteresis characteristic. With the spindle rotating in the forward direction, let $V_{NU}$ represent the slicing level when the signal RTS is rising, and let $V_{ND}$ represent the slicing level when signal RTS is decaying, where $V_{NU} < V_{ND}$. With the spindle rotating in the reverse direction, let $V_{RU}$ denote the slicing level when RTS is rising, and let $V_{RD}$ denote the slicing level when RTS is decaying, where $V_{RU} < V_{RD}$. The one-revolution pulse RPS therefore will appear as shown in FIG. 5(B) when the spindle is rotating in the forward direction, and as shown in FIG. 5(C) when the spindle is rotating in the reverse direction. In other words, the position of the rectangular pulse during forward rotation differs from that during reverse rotation. This shift in position corresponds to more than one of the position pulses PPF, as shown in FIG. 5(D). With the proposed system described above, the instant at which the numerical value N is preset in counter 41 is the moment $t_N$ at which pulse RTP (FIG. 5(B)) rises during forward rotation, or the moment $t_R$ at which pulse RTP (FIG. 5(C)) decays during reverse rotation. Consequently, the position at which the value N is preset, and which is calculated in terms of the position pulses PPF, differs by more than one pulse, so that the spindle stopping position is not the same for forward and reverse rotation. This obviously makes it impossible to stop the spindle at the commanded position with a high accuracy.

SUMMARY OF THE INVENTION

Accordingly, an object of the present invention is to provide a spindle orientation control system which enables the spindle of a machine tool to be rotated at a commanded speed, and to be stopped at a commanded angular position with a high accuracy.

Another object of the present invention is to provide a spindle orientation control system which enables the spindle of a machine tool to be rotated at a commanded speed, and to be stopped at a commanded angular position regardless of whether the spindle is being driven in the forward or reverse direction.

According to the present invention, the first object is attained by providing a speed control circuit and a position control circuit, wherein the spindle drive motor is controlled in a speed control mode when the spindle is to be rotated at a commanded speed, and is switched over to a position control mode when the spindle is to be stopped at a commanded position, with the positional control operation being effected by pulse control.

The second object is attained by changing a preset value in accordance with whether the spindle is rotating in the forward or reverse direction, the value being preset in a counter contained in a position control circuit which is controlled by generated pulses in a position control mode. Changing the preset value makes it possible to compensate for an error in the spindle stopping position that results from a difference in the position of the leading or trailing edge of the one-revolution pulse generated for each single revolution of the spindle, said difference arising because the position of the leading or trailing edge of the one-revolution pulse varies depending upon the direction of spindle rotation.

These and other features and advantages of the present invention will be apparent from the following description taken in conjunction with the accompanying drawings.

DESCRIPTION OF THE PREFERRED EMBODIMENT

Figure 6:
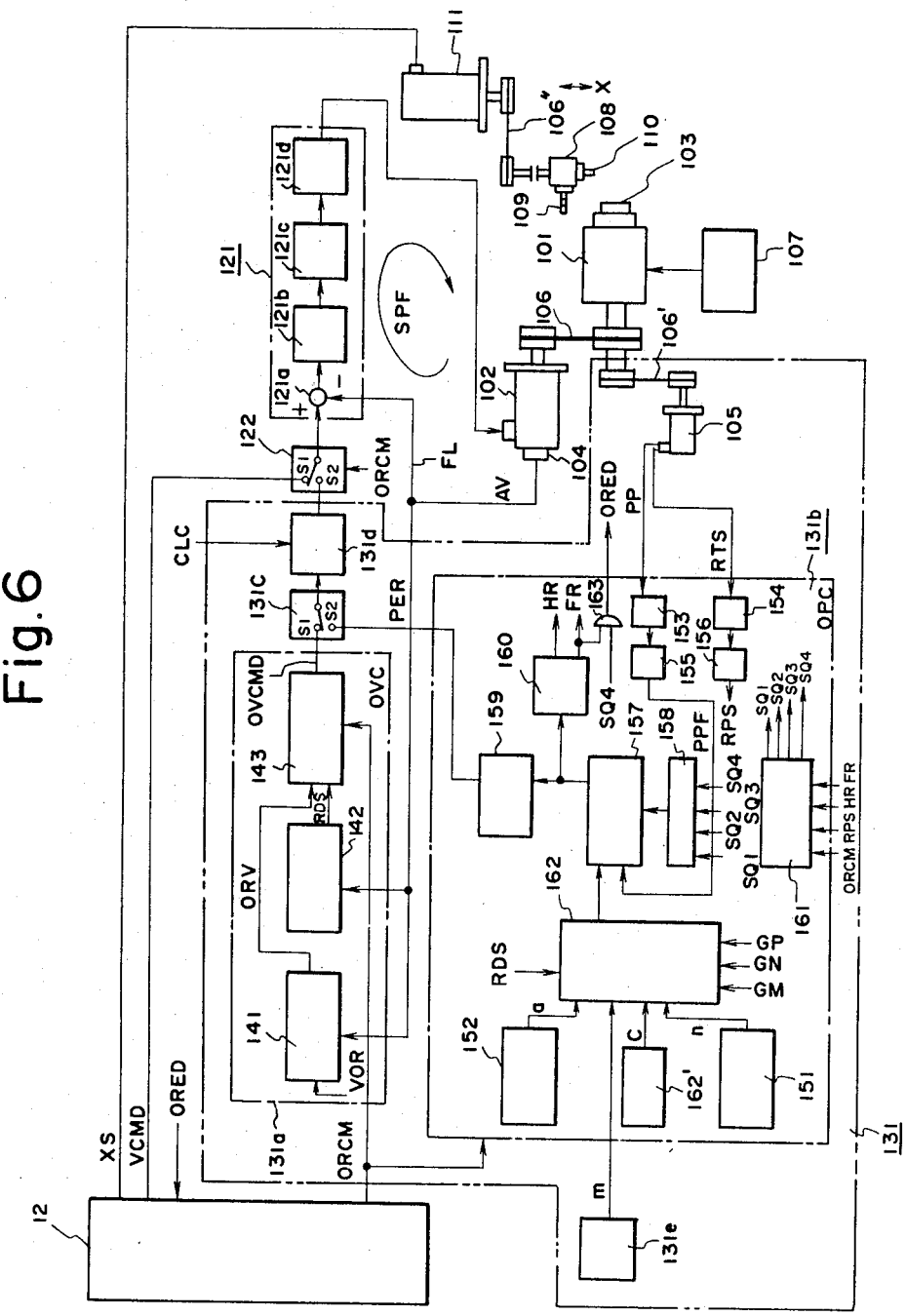
FIG. 6 is a circuit block diagram of a spindle orientation control system according to the present invention.

Referring first to FIG. 6, a spindle 101 holding a workpiece 103 is driven by a spindle motor 102 coupled to the spindle 101 by a belt 106. A tachogenerator 104, mounted on the shaft of the spindle motor 102, is adapted to generate an actual speed signal AV of a voltage in accordance with the actual speed of the spindle motor 102. A pulse coder 105 such as a rotary encoder, or a position coder, is coupled to the spindle 101 by a belt 106' and generates a position pulse PP whenever the spindle 101 rotates by a predetermined angle, and a one-revolution signal RTS whenever the spindle completes one revolution. A clamping mechanism 107 clamps the spindle 101 against movement at the end of a spindle orientation operation. A tool magazine 108 holds a rotary tool 109 and a turning cutter 110 for lathe work. An X-axis drive motor 111, coupled to the tool magazine 108 via a belt 106", transports the desired tool along the X-axis under the control of a numerical control device 12. The latter device, referred to also as an NC device, produces a spindle orientation command ORCM, a spindle rotational speed command VCMD, a drive signal XS for driving the motor 111, and a variety of other signals.

A well-known speed control circuit, shown at numeral 121, includes an adder 121a for producing a speed error voltage which is the difference between the rotational speed command VCMD and the actual speed AV of the spindle motor 102, this operation being performed in a speed control mode, a well-known phase compensating circuit 121b, a phase control circuit 121C for controlling the firing timing of thyristors in accordance with the speed error voltage, and a thyristor circuit 121d, whose thyristors are controlled as described, for supplying the spindle motor 102 with a voltage corresponding to the speed error. The speed control circuit 121, tachogenerator 104 and a speed feedback line FL form a speed control loop SPF.

A spindle orientation control circuit 131 includes a speed command circuit 131a which issues a spindle speed command OVCMD at the time of an orientation control operation, a position control circuit 131b for stopping the spindle at any desired orientation, a changeover switch 131c for delivering selectively, at the time of the orientation control operation, the spindle speed command OVCMD from the speed command circuit 131a, and a positional error signal PER from the position control circuit 131b, a gain changeover control device 131d for adjusting the speed gain in response to a clutch changeover signal CLC, and a switch 131e for externally setting, in the form of a 12-bit digital value, the spindle stopping position. Specifically, and with reference also to FIG. 7, the switch 131e is employed to enter m-number of pulses corresponding to an angle of M degrees measured from the machine zero point MRP to the commanded spindle stopping position CP. RTSP in FIG. 7 denotes an angular position at which the one-revolution signal RTS is generated. Thus, if we assume that the pulse coder 105 generates $2^{12}$ (=4096) pulses through a quadrupling circuit (described below) owing to one revolution of the spindle, then the switch 131e will be manipulated to enter a number of pulses m equivalent to $(M/360)\cdot 4096$ (i.e., $m=(M/360)\cdot 4096$) in the form of a 12-bit digital value in order to stop the spindle at the point CP.

The speed control circuit 131a includes an orientation speed sensing circuit 141 which generates, at the time of an orientation operation, a speed attainment signal ORV upon sensing that the spindle 101 has attained a predetermined speed $V_{OR}$ at which orientation is possible, a rotational direction sensing circuit 142 for producing a rotational direction signal RDS upon sensing the direction in which the spindle is rotating, and an orientation speed command circuit 143 for producing the speed command signal OVCMD at the time of an orientation operation.

Figure 1:
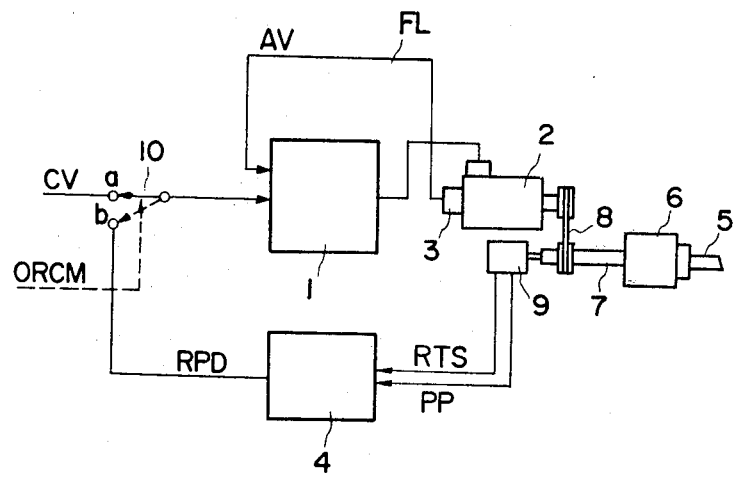
FIG. 1 is a block diagram of a servo system employed in positional control of a spindle according to a previous proposal.
Figure 2A:
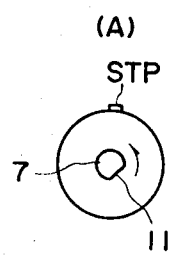
FIG. 2 is an illustrative view useful in describing spindle orientation.
Figure 2B:
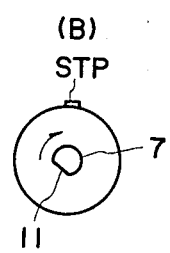
Figure 7:
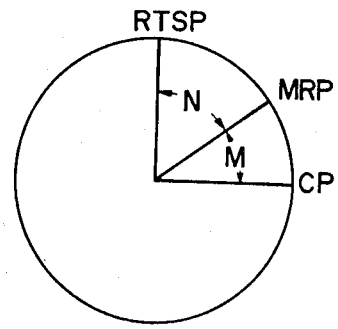
FIG. 7 is an illustrative view useful in describing how a machine starting point, one-revolution pulse generation position and spindle stopping position are related.
Figure 3:
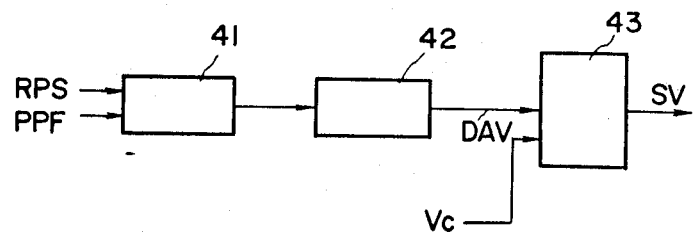
FIG. 3 is a block diagram of a circuit for generating a position deviation signal.
Figure 4:
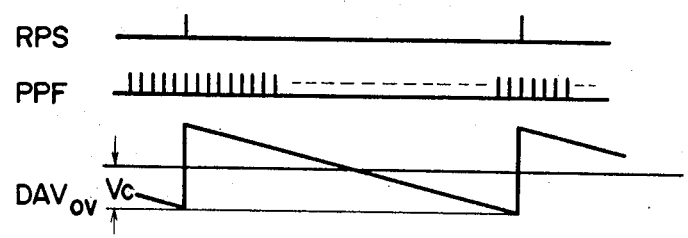
FIG. 4 is a waveform diagram of signals associated with the circuit of FIG. 3.
Figure 4:
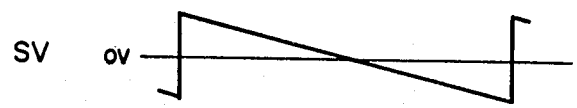
Figure 5:
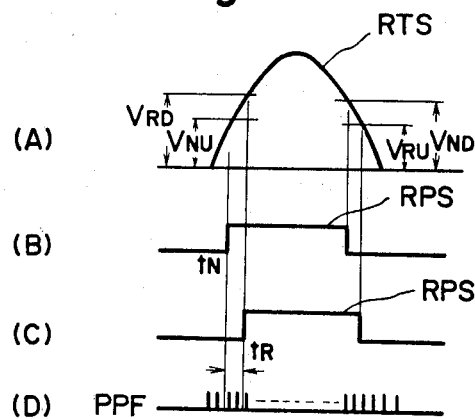
FIG. 5 is a waveform diagram useful in describing a shift in spindle stopping position.

The position control circuit 131b includes a switch 151 for internally setting the spindle stopping position by digitally setting in the form of 12 bits the number of pulses n, equivalent to $(N/360)\cdot 4096$ (i.e., $n=(N/360)\cdot 4096$), corresponding to the number of degrees N measured from the angular position RTSP to the zero point MRP in FIG. 7, a register 152 in which a 12-bit digital value a (100 . . . 01=2049 in this embodiment) has been set, line receives 153, 154 which receive the position signal PP and the one-revolution signal RTS, respectively, generated by the pulse coder 105, a quadrupling circuit 155 which, since the position signal PP is composed of two sinusoidal waves displaced in phase from each other by $\pi/2$, is adapted to shape the sinusoidal waves into rectangular waves, to differentiate the rectangular waves, and to produce position pulses PPF in sync with the leading edges of the resulting signal, the frequency of position pulses PPF being four times the frequency of position signals PP, a slicing circuit 156 for producing the one-revolution pulse RPS, a 12-bit up-down counter 157 having a capacity equivalent to the 4096 position pulses PPF generated by the quadrupling circuit 155 when the spindle makes one full revolution, an up-down dirction control circuit 158 for controlling the direction in which the up-down counter 157 counts, a DA converter 159 for producing an analog voltage which is proportional to the content of the up-down counter 157, a decoder 160 for generating a signal HR when the content of the up-down counter 157 has attained a value b equivalent to $|(2^{12}-1)-a|$ (in this embodiment, b is equal to 011 . . . 10=2046, which is equivalent to the number of position pulses generated by the quadrupling circuit 155 during approximately 180° of spindle rotation), and for generating a signal FR when the content of the counter has attained at value of 00 . . . 0 (all zeros), a sequence counter 161, a stopping position correction circuit 162' which is set to a value c when c-number of position pulses PPF have been generated from the instant $t_N$ (FIG. 5) at which the one-revolution pulse RTP rises during forward spindle rotation, to the instant $t_R$ at which the one-revolution pulse RPS falls during reverse spindle rotation, and which delivers the value c at the time of reverse rotation, but which delivers zero at the time of forward rotation, a numerical value selection/arithmetic circuit 162 for selecting one of the numerical values a, m, n, c and for presetting the up-down counter 157 to the selected value, and an AND gate 163 for producing an orientation end signal ORED. The sequence counter 161 delivers a first sequence state signal $SQ_1$ (logical "1") in response to the generation of the orientation command ORCM, as well as second, third and fourth sequence state signals $SQ_2$, $SQ_3$, $SQ_4$ (all logical "1") in response to the generation of the one-revolution pulse RPS, and to the generation of the signals HR (logical "1") and FR (logical "1"), respectively. The numerical value selection/arithmetic circuit 162 presets the up-down counter 157 to $-m$ or to $(m-c)$ in accordance with the spindle rotational direction signal RDS owing to generation of the one-revolution pulse RPS (GM=logical "1") when $SQ_1$ is logical "1", presets the up-down counter 157 to $-n$ or to n in accordance with the spindle rotational direction signal RDS owing to generation of the signal HR (logical "1") (GN=logical "1") when $SQ_2$ is logical "1", and presets the up-down counter 157 to a or to $-a$ owing to generation of the signal FR (logical "1") (GP=logical "1") when $SQ_4$ is logical "1".

Figure 8:
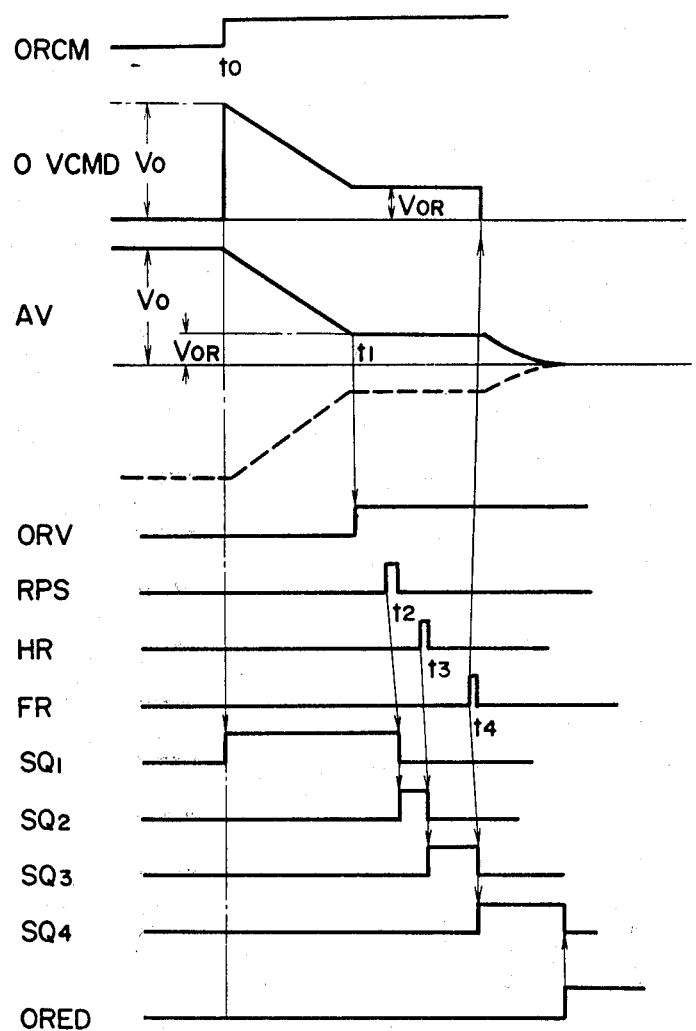
FIG. 8 is a waveform diagram of signals associated with the circuit of FIG. 6 for the case where an orientation command is issued during forward rotation of a spindle.
Figure 9:
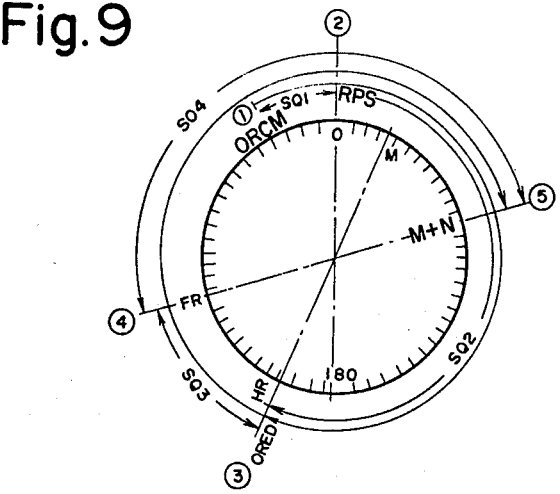
FIGS. 9 and 10 are illustrative views useful in describing orientation operations performed when the spindle is being rotated in the forward and reverse direction, respectively.

The operation of the present invention will now be described with reference to FIGS. 8 and 9.

We will assume that spindle 101 is being rotated in the forward direction at a rotational speed $V_o$ owing to the speed command VCMD from the NC device 112. Under this condition, when the orientation command ORCM goes to logical "1" ($SQ_1$="1") at time $t_o$, (position (1) in FIG. 9), the contact of the changeover switch 122 is changed over from $S_1$ to $S_2$ and the orientation speed command circuit 143 simultaneously issues the speed command OVCMD which decreases toward zero from the value $V_o$. As a result, the spindle motor 102 begins decelerating as it follows the decreasing speed command OVCMD and, at time $t_1$, attains a rotational speed of $V_{OR}$ at which orientation of the spindle becomes possible. The orientation speed sensing circuit 141 senses this speed and generates the speed attainment signal ORV (logical "1") at time $t_1$. The speed command circuit 143 responds to the "1" logic delivering a $V_{OR}$ output as the speed command OVCMD, also at time $t_1$. The spindle 101 therefore continues to be rotated at the constant speed $V_{OR}$. The one-revolution signal RPS is generated at time $t_2$ (position (2) in FIG. 9), so that the second sequence state is achieved ($SQ_2$="1") in response to the leading edge of the one-revolution pulse RPS. The generation of the pulse RPS sends the gate signal GM to logical "1" so that the numerical value $-m$ which has been set in the externally set switch 131e is preset in the up-down counter 157 through the numerical value selection/arithmetic circuit 162. The spindle 101 continues to be rotated at the speed $V_{OR}$. Meanwhile, the quadrupling circuit 155 generates a single position pulse PPF each time the spindle 101 rotates by a predetermined amount, namely by 360°/4096. The position pulses PPF are counted up in the up-down counter 157. Whether the counter 157 counts the position pulses PPF up or down is determined by the up-down control circuit 158, as noted earlier. Specifically, the pulses are counted up in the sequence states $Q_2$, $Q_3$, and counted down in the sequence state $Q_4$. The spindle 101 continues to rotate and, at time $t_3$ (position (3) in FIG. 9), has rotated through an angle of (B+M) degrees (equal to approximately 180°+M°) which corresponds to (b+m)-number of position pulses PPF. Therefore, at time $t_3$, the content of the up-down counter 157 attains the value b, and the decoder responds by issuing the signal HR (logical "1"), whereby the third sequence state is attained ($SQ_3$ to logical "1"). As a result, the gate signal GN goes to logical "1", and the numerical value $-n$ which has been set in the externally set switch 151 is preset in the up-down counter 157 through the numerical value selection/arithmetic circuit 162. The spindle 101 still continues to be rotated at the speed $V_{OR}$, and at time $t_4$ (position (4) in FIG. 9) has rotated through an angle of N degrees, equivalent to n-number of position pulses. Therefore, at time $t_4$, the content of the up-down counter 157 becomes zero, signal FR from decoder 160 goes to logical "1," and the fourth sequence state is attained. The changeover switch 131c responds to the "1" logic of signal FR by switching its contact from $S_1$ to $S_2$, thereby switching from the speed control to the position control mode. At the same time, the numerical value a which has been set in the register 152 is preset in the counter 157 through the numerical value selection/arithmetic circuit 162. The value a, it should be noted, is equivalent to the number of position pulses corresponding to about 180° of spindle rotation. Further, the speed command VCMD becomes zero at time $t_4$. The DA converter 159 produces the positional error signal PER of a voltage proportional to the content of the up-down counter 157, and the spindle motor 102 continues to be rotated in the forward direction but at a speed which now corresponds to the signal PER. In accordance with the position control mode, the content of the up-down counter 157 is counted down each time a position pulse PPF is generated, with the result that the output voltage of the DA converter 159 gradually decreases, the actual speed AV of the spindle motor 102 diminishing in accordance with the DA converter output. When the spindle has rotated through an angle of $(360-B)$ degrees (approximately 180°), the content of the counter 157 becomes zero (FR=logical "1"), and the AND gate 163 sends the orientation end signal ORED to the NC device 112 to terminate the orientation control operation.

In accordance with the foregoing control operation, the spindle 101, following the generation of the one-revolution pulse RPS, is rotated by (B+M) degrees during the interval that $SQ_2$ is at logical "1", by N degrees during the interval that $SQ_3$ is at logical "1", and by $(360-B)$ degrees during the interval that $SQ_4$ is at logical "1". Thus, the spindle is stopped correctly at the commanded angular position or orientation after having been rotated by a total of $360+(M+N)$ degrees.

The control operation described above dealt with forward rotation of the spindle 101. If the orientation command ORCM is generated when the spindle is rotating in the reverse direction then the orientation control operation proceeds while rotating the spindle in the reverse direction and is almost the same as the operation described above. The only difference is that the values (m-c), n are preset instead of $-m$, $-n$, and the value $-[(2^n-1)-b]$ instead of $[(2^n-1)-b]$.

Figure 10:
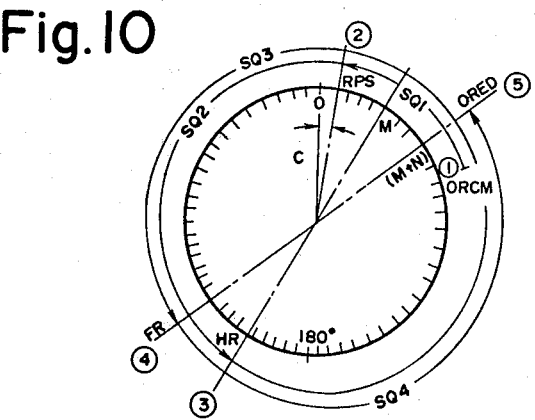

Now, with the spindle rotating in the reverse direction, assume that the orientation command ORCM is generated ($SQ_1$="1") when the spindle is at the position (1) in FIG. 10. The generation of the command ORCM causes the spindle to begin rotating at the speed $V_{OR}$ at which orientation becomes possible, and the one-revolution pulse RPS is generated ($SQ_2$="1") when the spindle is at the position (2). It should be noted that the position at which the one-revolution pulse RPS is generated is displaced by an amount equivalent to c-number of position pulses PPF from the position at which it was generated in the case of forward spindle rotation. The numerical value selection/arithmetic circuit 162 responds to the pulse RTP to select the values m and c, to perform the operation m−c, and to preset the result of this operation in up-down counter 162. The spindle continues rotating at the speed $V_{OR}$ and the up-down counter 162 counts up the position pulses PPF, with the content of the counter attaining the value b when the spindle reaches the position (3) after rotating by an angle of (B−M+C) degrees, which corresponds to (b−m+c)-number of position pulses PPF. At this time the decoder 160 generates the signal HR ($SQ_3$="1"), thereby presetting the up-down counter 157 to n. The spindle continues rotating at the speed $V_{OR}$ and the up-down counter 157 counts up the position pulses PPF, with the content of the counter attaining the value zero when the spindle reaches the position (4) after rotating by an angle of (360−N) degrees, at which time the decoder 160 products the signal FR ($SQ_4$=logical "1"). The logical "1" value of signal FR causes the counter 157 to be preset to the value a $[=-([2^{12}-1]\simeq b)]$, that is, to a number of pulses (−100 ... 001) corresponding to (−360+B−180) degrees. At this point the operation shifts from speed control to position control, with the contact of the changeover switch 131c being changed over from $S_1$ to $S_2$. From this point on the spindle drive motor 102 is driven in accordance with an error voltage (the output of the DA converter 159) that is proportional to the content of the up-down counter 157. The counter 157 now counts down the position pulses PPF since the circuitry is now operating in the positional control mode. The content of the counter 157 reaches zero when the spindle 101 arrives at the position (5) after rotating by (−360+B) degrees, and AND gate 163 delivers the orientation end signal ORED which is fed to the NC device 112 to terminate the orientation control operation. In accordance with the above operation, the spindle 101, following the generation of the one-revolution pulse RPS, is rotated by (B−M+C) degrees during the interval that $SQ_2$ is a "1", by (360−N) degrees during the interval that $SQ_3$ is a "1", and by [360−(B+C)] degrees during the interval that $SQ_4$ is a "1". Thus, the spindle is stopped correctly at the commanded angular position after having been rotated [720−(M+N)] degrees.

Figure 11:
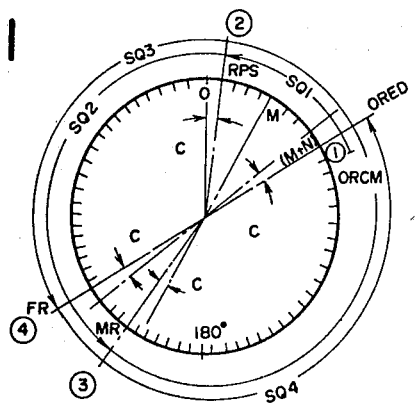
FIG. 11 is an illustrative view useful in describing the case where no compensation of spindle stopping position is effected during reverse rotation of the spindle.

FIG. 11 shows a case in which orientation is performed without correcting the stopping position when the spindle is rotating in the reverse direction. Here the orientation command ORCM is issued at exactly the same instant as in the case of FIG. 10. It can be appreciated that the stopping position is displaced by C degrees.

In accordance with the present invention as described above, the spindle stopping position is unchanged regardless of the direction of spindle rotation, even though a pulse coder is employed. The invention thus assures that the spindle will always be stopped at the commanded position with a high degree of accuracy.

Although the present invention has been described in its preferred form with a certain degree of a particularly, it is obvious that many modifications and variations are possible in the light of the above teachings. It is therefore to be understood that within the scope of the appended claims, the invention may be practiced otherwise than as specifically described.

What we claim is:

1. A method of controlling the orientation of a spindle which comprises the steps of:
    sensing the actual speed of a motor for driving the spindle to obtain an actual speed signal;
    decelerating the motor on the basis of a spindle stopping command by means of a speed control circuit until the spindle is rotating at a constant predetermined speed, the deceleration being conducted in such a manner that the error between the actual speed signal and a speed command signal approaches zero;
    generating a spindle stopping position command signal;
    generating a positional error signal upon comparing, after the motor has attained the predetermined speed, the spindle stopping position command signal and a spindle orientation sensing signal;
    controlling the rotation of the spindle, using the generated positional error signal with the speed control circuit instead of said speed command signal, so as to gradually decelerate the motor, and so as to make the positional error signal approach zero; and
    correcting the spindle stopping position command signal in accordance with the direction of spindle rotation.

2. The method according to claim 1, in which the step of decelerating the motor is conducted by using a speed command signal which begins dropping gradually when the spindle stopping command is generated, and then attains a value corresponding to a predetermined low speed.

3. An apparatus for controlling the orientation of a spindle driven by a motor, which apparatus comprises:
    speed sensor means for producing an actual speed signal upon sensing the actual rotational speed of the motor;
    speed control circuit means for effecting control in such a manner that the error between the actual speed and a commanded speed approaches zero; and
    a spindle orientation control circuit which includes spindle orientation sensing means for generating a single position pulse whenever the spindle rotates by a predetermined angle, and a one-revolution pulse whenever the spindle makes one full revolution, spindle stopping position command means for commanding the stopping position of the spindle, position error signal generating means for generating a position error signal on the basis of the spindle orientation and commanded stopping position, means for sensing the direction of spindle rotation, and correction means for correcting the commanded stopping position in accordance with the direction of spindle rotation;
    the spindle being rotated at the commanded speed by said speed control circuit means, and the rotation of the spindle being controlled in such a manner that the position error signal approaches zero when said spindle orientation control circuit issues a command for stopping the spindle at a predetermined position, a correction being effected of a spindle stopping position error that results from a difference between the position of the leading edge of said one-revolution pulse during forward rotation of the spindle and the position of the trailing edge of said one-revolution pulse during reverse rotation.

4. The apparatus according to claim 3, in which the spindle orientation control circuit is controlled by pulses.

5. The apparatus according to claim 3, in which the position error signal generating means comprises a counter and digital-to-analogue converter, and said correction means comprises means for presetting said counter.

6. A method for stopping a rotating spindle at a command position in a system which includes a motor to rotate the spindle, speed control circuit means for receiving an input signal and driving the motor so that its actual speed conforms to the input signal, and spindle position sensing means for generating a position pulse each time the spindle rotates through a predetermined angular increment and for generating an orientation pulse each time the spindle makes a complete revolution, the angular position of the spindle when an orientation pulse is generated being dependent upon the direction of rotation of the spindle, wherein the method comprises the steps of:

reducing the level of the input signal applied to the speed control circuit means until the spindle is slowed to a predetermined speed;

keeping the level of the input signal applied to the speed control circuit means constant after the predetermined speed is achieved in order to maintain the predetermined speed;

sensing the direction of rotation of the spindle;

initiating a count of position pulses when an orientation pulse is generated as the spindle rotates at the predetermined speed;

counting a first quantity of position pulses while the spindle rotates at the predetermined speed to move the spindle to a predetermined angular deviation from the command position, the first quantity of pulses being corrected depending upon the direction of rotation of the spindle;

counting a second quantity of position pulses corresponding in number to the predetermined angular deviation from the command position, the voltage of the input signal applied to the speed control circuit means being reduced as the second quantity of position pulses is counted so that the voltage substantially reaches zero when the second quantity is entirely counted.

7. The method of claim 6, wherein the step of counting the first quantity of pulses comprises the steps of counting position pulses up from a first value until a second value is achieved, and counting position pulses up from a third value until a fourth value is achieved.

8. The method of claim 7, wherein the first quantity of pulses is corrected before the step of counting position pulses up from the third value is initiated.

9. The method of claim 6, wherein the step of counting the second quantity of pulses is accomplished by storing a value corresponding to the second quantity, decrementing the stored value by one each time a position pulse is generated, converting the stored value to an analog signal, and applying the analog signal to the input of the speed control circuit means.

10. The method of claim 9, wherein the step of applying the analog signal to the input of the speed control circuit means comprises the step of activating a switch for changing the input signal applied to the speed control circuit means.

* * * * *

UNITED STATES PATENT AND TRADEMARK OFFICE
CERTIFICATE OF CORRECTION

PATENT NO. : 4,398,138
DATED : August 9, 1983
INVENTOR(S) : Kohzai et al.

Page 1 of 2

It is certified that error appears in the above-identified patent and that said Letters Patent is hereby corrected as shown below:

```
Col. 2, line  6, "a" should be --a--;
        line 34, "a" should be --a--;
        line 34, "b" should be --b--.

Col. 3, line 14, "b" should be --b--.

Col. 6, line 10, "m" should be --m--;
        line 28, "n" should be --n--;
        line 32, "a" should be --a--;
        line 54, "b" should be --b--;
        line 55, "b" should be --b--;
        line 62, "c" should be --c--;
        line 62, "c-number" should be --c-number--;
        line 67, "c" should be --c--.
```

UNITED STATES PATENT AND TRADEMARK OFFICE
CERTIFICATE OF CORRECTION

PATENT NO. : 4,398,138
DATED : August 9, 1983
INVENTOR(S) : Kohzai et al.

It is certified that error appears in the above-identified patent and that said Letters Patent is hereby corrected as shown below:

Col. 7, line 18, "n" (both occurrences) should be --$\underline{n}$--;
line 22, "a" should be --$\underline{a}$--;
line 22, "-a" should be -- -$\underline{a}$ --;
line 52, "-m" should be -- -$\underline{m}$ --.

Col. 8, line 2, "b" should be --$\underline{b}$--;
line 59, "-m" should be -- -$\underline{m}$ --;
line 59, "-n" should be -- -$\underline{n}$ --.

Col. 9, line 7, "m" should be --$\underline{m}$--;
line 7, "c" should be --$\underline{c}$--;
line 12, "b" should be --$\underline{b}$--;
line 17, "n" should be --$\underline{n}$--;
line 24, "a" should be --$\underline{a}$--.

Col. 11, line 6, "analogue" should be --analog--.

Signed and Sealed this

Fifth Day of June 1984

[SEAL]

Attest:

GERALD J. MOSSINGHOFF

Attesting Officer         Commissioner of Patents and Trademarks